United States Patent
Wang et al.

(10) Patent No.: US 12,021,484 B2
(45) Date of Patent: Jun. 25, 2024

(54) MULTI-POINT PARALLEL SYNCHRONOUS DRIVE DEVICE AND APPLICATION THEREFOR

(71) Applicant: ARCTECH SOLAR HOLDING CO., LTD., Jiangsu (CN)

(72) Inventors: Shitao Wang, Lujia Town Kunshan (CN); Zhengming Yu, Lujia Town Kunshan (CN); Shunyong Tong, Lujia Town Kunshan (CN); Jingqiang Chen, Lujia Town Kunshan (CN); Minjie Wang, Lujia Town Kunshan (CN)

(73) Assignee: Archtech Solar Holding Co. LTD, Jiangsu (CN)

( * ) Notice: Subject to any disclaimer, the term of this patent is extended or adjusted under 35 U.S.C. 154(b) by 753 days.

(21) Appl. No.: 17/256,960

(22) PCT Filed: Dec. 3, 2019

(86) PCT No.: PCT/CN2019/122815
§ 371 (c)(1),
(2) Date: Dec. 29, 2020

(87) PCT Pub. No.: WO2021/077554
PCT Pub. Date: Apr. 29, 2021

(65) Prior Publication Data
US 2021/0328542 A1    Oct. 21, 2021

(30) Foreign Application Priority Data
Oct. 23, 2019  (CN) .......................... 201911013335.6

(51) Int. Cl.
*H02S 20/32*    (2014.01)
*F16H 1/16*    (2006.01)
(Continued)

(52) U.S. Cl.
CPC .............. *H02S 20/32* (2014.12); *F16H 1/16* (2013.01); *H02K 7/1166* (2013.01); *F16H 2057/02013* (2013.01)

(58) Field of Classification Search
CPC ......... H02S 20/32; H02K 7/1166; F16H 1/16; Y02E 10/47
(Continued)

(56) References Cited

U.S. PATENT DOCUMENTS

2016/0013751 A1 * 1/2016 Michotte De Welle ..................... F24S 30/425 136/246

* cited by examiner

*Primary Examiner* — Vivek K Shirsat
(74) *Attorney, Agent, or Firm* — Woodard, Emhardt, Henry, Reeves & Wagner, LLP

(57) ABSTRACT

Multi-point parallel synchronous drive device, which includes a drive mechanism and several stages of driven mechanisms drivingly connected. The drive mechanism comprises a first power output for rotatably connecting with a power output shaft, and a second power output disposed below the first power output and parallel to the first power output along a power output direction. The several stages of the driven mechanism are arranged at intervals in the power output direction. The second power output of the drive mechanism is drivingly connected with a power input of the adjacent driven mechanism along the power output direction, and the adjacent two-stage driven mechanisms are drivingly connected along the power output direction. The driven mechanism at any stage comprises a power output for rotatably connecting with the power output shaft. The device can be applied to the a solar tracking system, with the main shaft as the power output shaft.

20 Claims, 3 Drawing Sheets

(51) Int. Cl.
*F16H 57/02* (2012.01)
*H02K 7/116* (2006.01)
(58) Field of Classification Search
USPC .................. 126/600, 576–577, 605–608
See application file for complete search history.

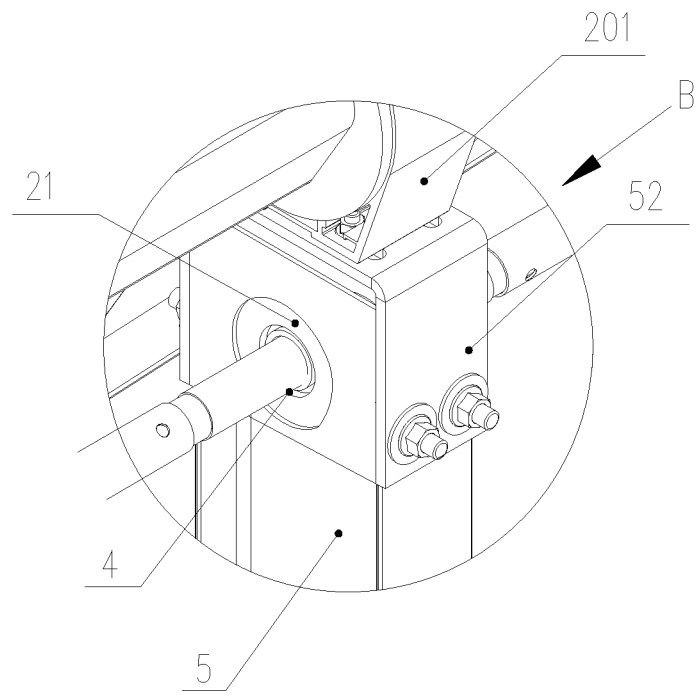
FIG. 4
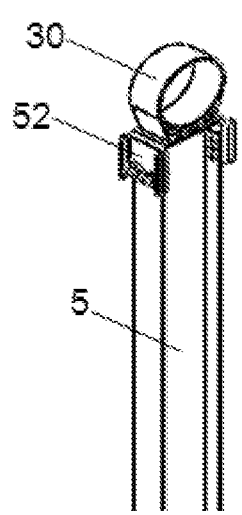
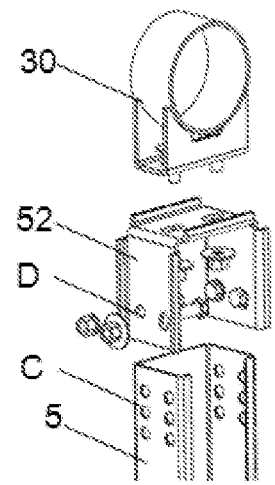
FIG. 5a  FIG. 5b

MULTI-POINT PARALLEL SYNCHRONOUS DRIVE DEVICE AND APPLICATION THEREFOR

CROSS REFERENCE TO RELATED APPLICATION

This application is a U.S. National Stage of International Application No. PCT/CN2019/122815, filed on Dec. 3, 2019, titled "Multi-Point Parallel Synchronous Drive Device and Application Therefor," which claims priority to CN 201911013335.6 filed on Oct. 23, 2019. Each application, publication, and patent listed in this paragraph are hereby incorporated by reference in their entireties.

TECHNICAL FIELD

The disclosure relates to the field of transmission technology, and more particularly, to a multi-point parallel synchronous drive device and an application of the multi-point parallel synchronous drive device.

BACKGROUND

In the field of prior mechanical transmission, especially a drive tracking system of the current common solar bracket, a drive mechanism such as a reducer or push rod, linear actuator, etc. is generally used for single-point drive, in this way, a free long cantilever structure is formed in addition to the drive point, which is easy to produce the free long cantilever twisting in the case of strong winds. The longer the cantilever, the more serious the twisting and superposition, which causes the risk of damage to components and brackets. At the same time, the low natural frequency also increases the risk of resonance. Specifically, in a single-axis tracking system, except for the drive point which is a fixed locking point of this drive mechanism under strong wind, the other points are all freely movable parts. Since the distance from the drive point to the outermost edge of the system in a single solar tracking system is generally a length of more than ten meters or even tens of meters, under the action of gusts, it is easy to produce risks such as deformation and resonance, so that it is impossible to realize the multi-point common lock function in strong wind. Deformation and vibration of the system will cause damage to the system, and long-term operation will also cause risks such as cracking of the solar modules carried on it. Moreover, in practical applications at present, a single solar tracking system can only satisfy up to three 1500V photovoltaic strings, which is inconvenient for the design of the power station.

Therefore, those skilled in the art urgently need a multi-point parallel synchronous drive device and its application that can achieve multi-point locking, significantly improve wind resistance, and greatly improve stability and reliability.

SUMMARY

In view of the above-mentioned shortcomings in the prior art, the present disclosure provides a multi-point parallel synchronous drive device that can achieve multi-point locking, significantly improve wind resistance, and greatly improve stability and reliability, and an application of the multi-point parallel synchronous drive device. Compared with the currently used single-point drive device, the device innovatively transforms the vertical input and output of the traditional worm gear into two synchronous outputs parallel to the gear output, effectively using the large holding torque of the worm gear transmission. In addition, combined with the mechanical drive shaft, a multi-point parallel synchronous drive is realized, which realizes a stable locking under severe weather conditions.

In order to achieve the above object, a multi-point parallel synchronous drive device is provided. The present disclosure adopts the following technical solutions:

A multi-point parallel synchronous drive device includes a drive mechanism and several stages of driven mechanisms drivingly connected.

The drive mechanism includes a first power output for rotatably connect with the power output shaft, and a second power output disposed below the first power output and parallel to the first power output along the power output direction.

Several stages of the driven mechanisms are arranged at intervals along the power output direction, the second power output of the drive mechanism is drivingly connected with a power input of the adjacent driven mechanism along the power output direction, and the adjacent two-stage driven mechanisms are drivingly connected along the power output direction; the driven mechanism at any stage includes a power output for rotatably connecting with the power output shaft.

Preferably, the drive mechanism includes a worm gear transmission unit I and a transmission gear as a second power output; the worm gear transmission unit I includes a worm I and a gear I as a first power output.

The transmission gear engages with a lower side of the worm I, the gear I engages with an upper side of the worm I; and an end surface of the transmission gear is parallel to an end surface of the gear; the gear I is used for rotatably connecting with the power output shaft.

The drive mechanism is drivingly connected to the power input of the driven mechanism along the power output direction through the transmission gear.

Further, a mechanical drive shaft is fixedly connected in the transmission gear, and the mechanical drive shaft are parallel to the power output direction of the first power output.

The drive mechanism is drivingly connected to the power input of the adjacent driven mechanism through the mechanical drive shaft, and the adjacent driven mechanisms are drivingly connected to each other through the mechanical drive shaft.

Further, the drive mechanism further includes a drive motor, and an output shaft of the drive motor is drivingly connected with the worm or the mechanical drive shaft.

Further, a gear housing I with mounting holes is fixed on both sides of gear I along the power output direction, and the mounting holes are used for rotatably penetrating the power output shaft.

Further, the driven mechanism includes a worm gear drive unit II and a connector as a power input; the worm gear drive unit II includes a worm II and a gear II as a power output.

The connector are respectively connected to the mechanical drive shaft in an axial direction, and connected to the worm II in a vertical direction, for transmitting an axial rotation of the mechanical drive shaft to the worm; the gear II is engaged with an upper side of the worm II; and the gear II is rotatably connected with the power output shaft.

Further, a gear housing II with mounting holes is fixed on both sides of the gear II along the power output direction, and the mounting holes are used for rotatably penetrating the power output shaft.

Further, the connector is a commutator or a universal joint.

Further, the multi-point parallel synchronous drive device is provided in multiple rows, and the worms of the adjacent two rows of drive devices are drivingly connected to each other respectively.

Further, the multi-point parallel synchronous drive device is provided as multiple groups in series, and the transmission gears and connectors in multiple groups in the series of multi-point parallel synchronous drive devices are connected by the mechanical drive shaft, or by multiple mechanical drive shafts, multiple mechanical drive shafts are rotatably connected end to end; the number of the drive motor is 1, and a controller is provided accordingly, the controller is electrically connected to the drive motor.

Preferably, the several stages of driven mechanisms are evenly distributed on one or both sides of the drive mechanism.

The above-mentioned multi-point parallel synchronous drive device of the present disclosure can be applied to a solar tracking system, and the main shaft is used as the power output shaft therein. The main shaft is used to fix the solar module to realize multi-point parallel synchronous drive of the main shaft, that is, multiple fixed-point locks is formed to adapt to harsh weather and improve its operating performance and service life.

Compared with the prior art, the beneficial effects of the present disclosure are:

1) In the multi-point parallel synchronous drive device of the present disclosure, the drive mechanism cooperates with the driven mechanism, and they are synchronously connected through a mechanical drive shaft. The drive mechanism divides the power into two parallel outputs, one output to the power output shaft, the other drives the adjacent driven mechanism through the mechanical drive shaft, and the driven mechanism also drives the adjacent driven mechanism to synchronize transmission along the power transmission direction, so that in specific applications, the power outputs of several stages of the driven mechanism can work together on the power output shaft to form a multi-point drive power output shaft synchronous rotation coordination.

2) The drive mechanism and the driven mechanism of the disclosure both adopt a worm gear transmission structure, which converts the vertical input and output of the worm gear into two synchronous outputs parallel to the gear output, while retaining the large holding torque of the worm gear structure, combined with the mechanical drive shaft, the multi-point parallel synchronous drive is realized, which can realize a stable and reliable locking effect on the power output shaft under strong wind conditions. In addition, the design of the two-way parallel drive makes it only need to be arranged in the space of the original power output shaft, does not need to occupy extra space, and installation and maintenance are more convenient.

3) The device of the present disclosure is applied to a solar tracking system with excellent effects. When a strong wind comes, multiple driving points of the system become multiple fixed locking points, correspondingly greatly reducing the shake of the system, stability and reliability has been greatly improved, the distributed wind pressure and wind twist can be achieved, which greatly improves the reliability and stability of the system. In addition, the two-way power of the drive mechanism outputs in parallel along the direction of the main shaft, which makes the device easy to operate and maintain in the north-south direction when applied to the solar tracking system, which can effectively reduce the shielding of the transmission components to the solar components, especially the double-sided components, making the system design more flexible.

4) When the device of the present disclosure is used in a solar tracking system, the multi-point parallel synchronous drive device is provided according to the actual size of the photovoltaic string to be carried, and the distance between each drive device and the edge of the corresponding load system is not more than 10 meters, so in the case of strong winds, the deformation of the system is greatly reduced, the force is reduced, the torque is reduced, and the corresponding system cost is also greatly reduced.

5) In the prior art, a single solar tracking system can only satisfy up to 3 1500V photovoltaic strings, and a single solar tracking system using the multi-point parallel synchronous drive device of the present disclosure can realize the installation of 4 or more 1500V photovoltaic strings (A single 1500V photovoltaic string generally has 30 components). It has excellent load-bearing performance and can guarantee the stability of the system operation in extreme weather, especially strong wind conditions. Wherein, the single solar tracking system mentioned in the present disclosure refers to a system that can only satisfy a maximum of three 1500V photovoltaic strings on a single row of main shaft.

6) The single solar tracking system using the multi-point parallel synchronous drive device of the present disclosure only needs to provide a drive motor and a controller, and all the worm gears, transmission gears, and connectors are connected by a mechanical drive shaft, which is synchronously driven, reducing installation, operation and maintenance costs.

7) In the cooperative design of the drive mechanism and the driven mechanism of the present disclosure, by connecting the worms of the adjacent two rows of drive devices, it can also be applied to simultaneously drive multiple rows of power output shafts, thereby adapting to multi-platform the solar tracking system, that is, the driving of the east-west multi-row solar tracking system, which realizes the synchronous linkage of the multi-platform solar tracking system, so that the technical application of the present disclosure has a wider application range and stronger applicability.

BRIEF DESCRIPTION OF THE DRAWINGS

FIG. 4 is an enlarged view illustrating the structure at B in FIG. 2.

FIGS. 5a and 5b are enlarged views illustrating the structure at an upright column that separately supports a main shaft.

The meaning of the marked symbols in the figure is as follows:
- 1—drive mechanism, 10—worm gear drive unit I, 100—worm I, 101—gear housing I, 102—support base, 11—transmission gear.
- 2—driven mechanism; 20—worm gear drive unit II, 200—worm II, 201—gear housing II, 21—connector.
- 3—power output shaft/main shaft, 30—bearing race.
- 4—mechanical drive shaft.

5—column, 50—mounting side plate, 51—drive shaft seat, 52—column top seat, C—up and down adjustable hole III, D—fixed hole III.

6—solar module.

DETAILED DESCRIPTION OF THE EMBODIMENTS

In order to more clearly explain the embodiments of the present disclosure or the technical solutions in the prior art, the specific embodiments of the present disclosure will be described below with reference to the drawings. Obviously, the drawings in the following description are only some embodiments of the present disclosure. For those skilled in the art, without paying any creative labor, other drawings and other implementations can also be obtained from these drawings.

In order to make the drawings concise, the figures only show parts related to the present disclosure, and they do not represent their actual structures as products.

Example 1

Figure 1:
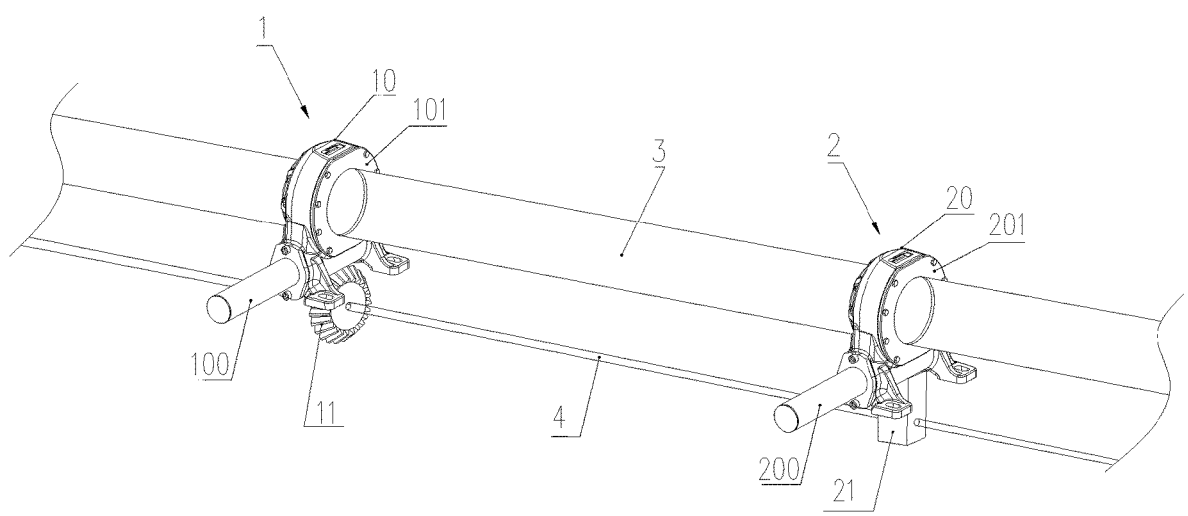
FIG. 1 is a schematic structural diagram illustrating a multi-point parallel synchronous drive device according to the present disclosure.
Figure 2:
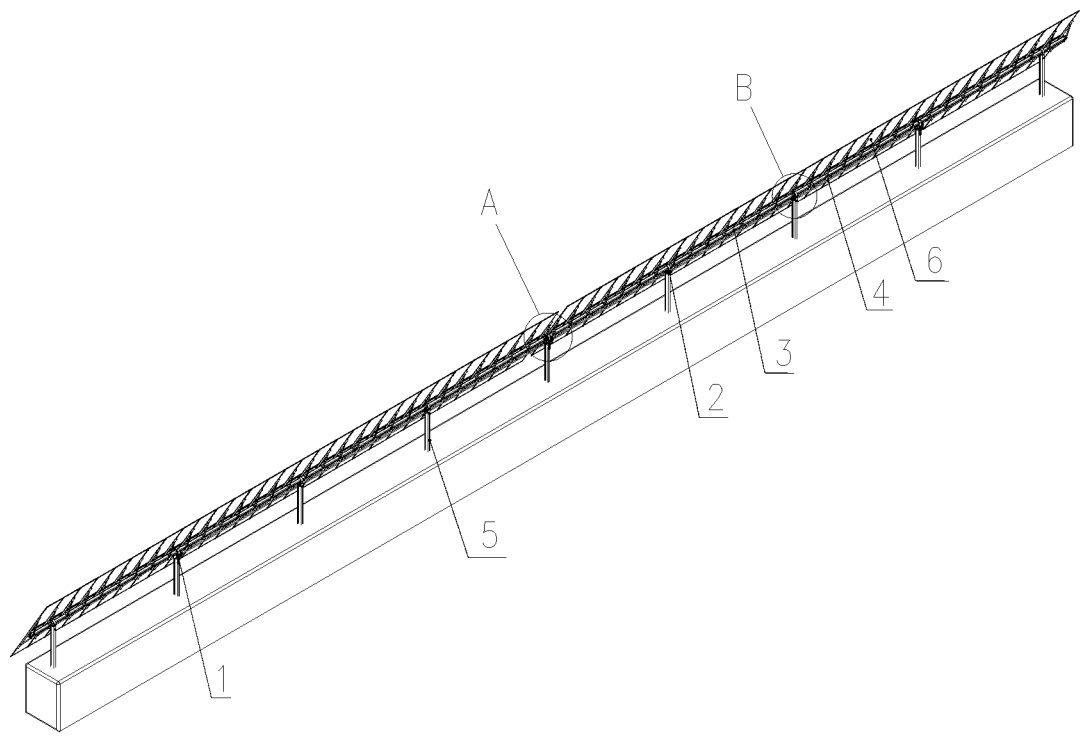
FIG. 2 is a schematic diagram illustrating a system structure in which the multi-point parallel synchronous drive device of the present disclosure is applied to a solar tracking system.
Figure 3:
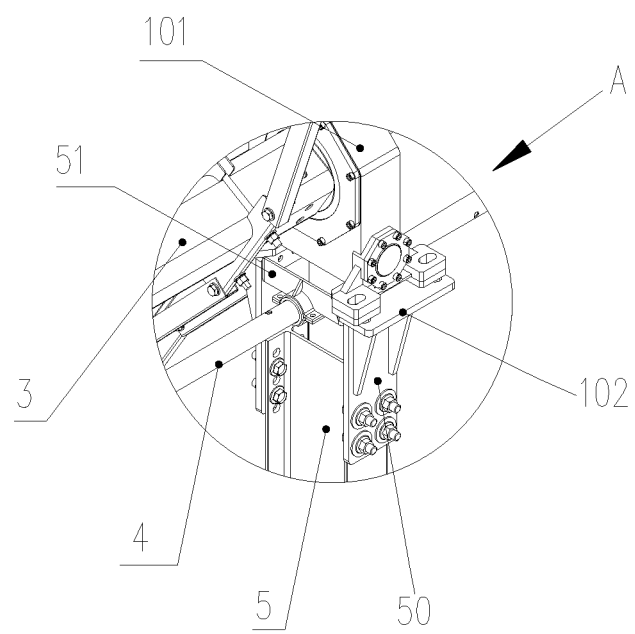
FIG. 3 is an enlarged view illustrating the structure at A in FIG. 2.

As shown in FIG. 1, a multi-point parallel synchronous drive device is showed, including a drive mechanism 1 and several stages of driven mechanisms 2 drivingly connected.

The drive mechanism 1 includes a first power output for rotatably connecting with a power output shaft 3, and a second power output disposed below the first power output and parallel to the first power output end along the power output direction, that is, the axial direction of the power output shaft.

The several stages of the driven mechanisms 2 are spaced apart along the power output direction, the second power output of the drive mechanism 1 is drivingly connected to the power input of the adjacent driven mechanism 2 along the power output direction, the adjacent two-stage driven mechanism is drivingly connected to each other along the power output direction; the driven mechanism 2 of any stage includes a power output for rotatably connecting with the power output shaft 3.

In the embodiment, when the drive mechanism 1 and the driven mechanism 2 are both rotatably connected with the power output shaft 3, the drive mechanism 1 outputs the power to the power output shaft 3 and the adjacent driven mechanism 2 via the first power output and second power output along the axial direction, respectively. The driven mechanism 2 correspondingly drives the adjacent driven mechanism 2 to synchronize the axial transmission, so that the power outputs of the several stages of driven mechanisms 2 can work together on the power output shaft to form a multi-point drive power output shaft synchronous rotation coordination, thereby the drive mechanism 1 and the driven mechanism 2 drivingly cooperate to realize the multi-point parallel synchronous drive rotation of the power output shaft.

As a preferred embodiment, several stages of driven mechanisms 2 are evenly spaced on one or both sides of the driving mechanism 1. Therefore, the stability and reliability of the multi-point parallel synchronous drive of the power output shaft 3 can be further improved.

Example 2

As shown in FIG. 1, a multi-point parallel synchronous drive device for a solar tracking system is showed, including a drive mechanism 1 and several stages of driven mechanisms 2 drivingly connected.

The drive mechanism 1 includes a first power output for rotatably connecting with the power output shaft 3, and a second power output disposed below the first power output and parallel to the first power output end along the power output direction, that is, the axial direction of the power output shaft.

The drive mechanism includes a worm gear drive unit I10 and a transmission gear 11 as a second power output. The worm gear drive unit I10 includes a worm I100 and a gear I as a first power output (the gear in the figure is located in a gear housing, which is not visually shown). The transmission gear 11 engages with the lower side of the worm I100, the gear I engages with the upper side of the worm I100, and the end surface of the transmission gear 11 is parallel to the end surface of the gear I. The gear I is used for rotatably connecting the power output shaft.

Several stages of the driven mechanisms 2 are arranged at intervals along the power output direction. The drive mechanism 1 is drivingly connected to the power input of the adjacent driven mechanism 2 through the transmission gear 11 along the power output direction. The two adjacent stages of the driven mechanism 2 is drivingly connected along the power output direction. The driven mechanism 2 of any stage includes a power output for rotatably connecting with the power output shaft 3.

In the embodiment, a worm gear drive unit is used in the drive mechanism 1, and the power is output along the axial direction to the power output shaft 3 and the adjacent driven mechanism 2 via the gear I and the transmission gear 11, respectively, and then, the adjacent driven mechanism 2 is driven to drive axially accordingly, so that the power outputs of the several stages of driven mechanisms 2 work together on the power output shaft 3 to form a multi-point drive power output shaft synchronous rotation coordination. In the traditional worm gear transmission mechanism, the input shaft and the output shaft are in a vertical relationship, and the embodiment converts the vertical input and output of the worm gear into two synchronous outputs parallel to the gear output, while retaining the large holding torque of the worm gear structure, which can lock the power output shaft under strong wind conditions.

As a preferred embodiment, a mechanical drive shaft 4 is fixedly connected in the transmission gear 11, and the mechanical drive shaft 4 is on the lower side of the first power output and parallel to the power output direction. The drive mechanism 1 is drivingly connected to the power input of the driven mechanism 2 through the mechanical drive shaft 4, the adjacent driven mechanism 2 is also drivingly connected through the mechanical drive shaft 4. Therefore, the synchronous coordinated transmission between the drive mechanism 1 and the several stages driven mechanism 2 is realized through the mechanical drive shaft 4, and the drive mechanism 1 outputs the power through the gear I and the transmission gear 11 to the power output shaft 3 and the mechanical drive shaft 4 in the axial direction, respectively, and the mechanical drive shaft 4 drives the adjacent driven mechanism 2 and then drives the adjacent driven mechanism 2 accordingly to axially transmit, so that the power output of the several stages driven mechanisms 2 acts on the power output shaft 3 together, to form a multi-point drive power output shaft 3 synchronous rotation coordination. In actual application, when the power output shaft 3 is connected, on the basis of using the large torque of the worm gear transmission, since the mechanical drive shaft 4 and the power output shaft 3 are designed to be two parallel synchronous output, it only needs to be arranged in the space of the original power output shaft, no additional space is required, and the installation, arrangement and maintenance are more convenient.

On the basis of this preferred example, the drive mechanism 1 further includes a drive motor, and the output shaft of the drive motor is drivingly connected to the worm I100, so that the motor drives worm I100 to drive the worm I to rotate, and drives the transmission gear 11 to rotate, or the output shaft of the drive motor is drivingly connected to the mechanical drive shaft 4, so that the motor drives the mechanical drive shaft 4 to drive the transmission gear 11 to rotate, thereby driving the worm I100 and the gear I to rotate. Therefore, the layout of the drive motor is more flexible and convenient.

More preferably, the driven mechanism 2 includes a worm gear drive unit II 20 and a connector 21 as a power input. The worm gear drive unit II20 includes a worm II200 and a gear II as a power output (the gear in the figure is located in the gear housing, which is not visually shown). The connector 21 is respectively connected to the mechanical drive shaft 4 in the axial direction and connected to the worm II200 in the vertical direction, for transmitting the axial rotation of the mechanical drive shaft 4 to the worm II200. The gear II engages with the upper side of the worm II 200, and the gear II is used for rotating and connecting the power output shaft 3.

Therefore, the solution provides a preferred arrangement form of the driven mechanism 2. The worm gear transmission unit is used, the drive mechanism 1 outputs the power through the worm gear I and the transmission gear 11 in parallel along the axial direction to the power output shaft 3 and the mechanical drive shaft 4, respectively, the mechanical drive shaft 4 synchronously drives the adjacent driven mechanism 2 to drive axially, so that the power outputs of the several stages of driven mechanisms 2 can work together on the power output shaft 3 to form a multi-point drive power output shaft synchronous rotation coordination, which can effectively improve the stability of the synchronous drive of the power output shaft.

More preferably, the multi-point parallel synchronous drive device is provided as multiple groups in series, and the transmission gears and connectors in multiple groups in the series of multi-point parallel synchronous drive devices are connected by one mechanical drive shaft, or by multiple mechanical drive shafts, multiple mechanical drive shafts are connected end to end, which can adapt to different landform. The number of the drive motors is 1, and a controller is provided accordingly, the controller is electrically connected to the drive motor. With this preferred solution, when multiple sets of multi-point parallel synchronous drive devices are required for linkage, only one drive motor and corresponding controller (drive motor and controller can be supported and fixed on the column 5), the controller uses a single-chip microcomputer, which is electrically connected to the drive motor, and all the transmission gears and connectors (including between the transmission gear and adjacent connectors and between two adjacent connectors) in multiple groups of multi-point parallel synchronous drive devices are connected by one mechanical drive shaft, or the transmission gears and connectors can also be connected by multiple mechanical drive shafts, and the multiple mechanical drive shafts are rotatably connected end to end by the universal joint, so that they can adapt to different landforms and be driven synchronously, which reduces installation, operation and maintenance costs. In addition, the aforementioned electrical connection between the drive motor and the controller is a conventional technical means in the field. The model of the single-chip microcomputer is the STM32 series, or other commercially available models can also be selected, which can realize the function of sending command signals to the driving motor, and no further detailed description will be given here.

More preferably, the multi-point parallel synchronous drive device can be provided as multiple parallel rows as needed, and the worms of the adjacent two rows of drive devices are drivingly connected to each other respectively. Specifically, the worm I100 in the first row of drive devices is drivingly connected to the worm worm I100 in the second row, up to the nth row of drive devices, and the several stages of worm I200 in the first row of drive devices is drivingly connected to the second row, up to the nth row of drive devices. In practical application, the transmission connection is realized through the transmission shaft, so as to realize the synchronous linkage of the multi-row drive device.

In the cooperative design of the drive mechanism and the driven mechanism of the present disclosure, by drivingly connecting the worms of two adjacent rows of drive devices, it can also be applied to simultaneously drive multiple rows of main shaft simultaneously, thereby adapting to the multi-platform solar tracking system, that is, driving of east-west multi-row solar tracking system, so that the synchronous linkage of the multi-platform solar tracking system is realized, which makes the technical application of the present disclosure more extensive and more applicable.

More preferably, a gear housing II201 with mounting holes is fixed on both sides of the gear II along the power output direction, and the mounting holes are used to rotatably penetrate the power output shaft 3. Therefore, the installation of the power output shaft 3 is facilitated. More preferably, the connector 21 is a commutator or a universal joint, or an existing component or assembly that can realize the function of commutation and power transmission. As shown in FIG. 4, the connector 21 is a commutator, and the mechanical drive shaft 4 is inserted into the commutator. The commutator is preferably a gear commutator. The gear commutator can synchronously transmit the power of the mechanical drive shaft to the worm II200 of the driven mechanism. The working principle of the gear commutator here is the prior art and will not be described in detail.

The preferred example provides a preferred setting form of the driven mechanism 5, through the connector 21 that can realize the function of commutation and power transmission, the axial power from the mechanical drive shaft 4 is transmitted to the worm gear drive unit II20 through commutation, thereby realizing the synchronous rotation of the power output shaft 3 and the worm gear II.

As another preferred embodiment, a gear housing I101 with mounting holes is fixed on both sides of the worm gear I along the power output direction, and the mounting holes are used for rotatably connecting the power output shaft 3. Therefore, the installation of the power output shaft 3 is facilitated.

On the basis of the above embodiments, the specific application of the technical solution of the multi-point parallel synchronous drive device of the present disclosure in a solar tracking system is also given, and the obtained application performance is extremely excellent, such as the following application examples 1 to 3.

Application Example 1

As shown in FIGS. 1 to 4, the multi-point parallel synchronous drive device of Examples 1 to 3 is applied to a solar tracking system to obtain the multi-point parallel synchronous drive solar tracking system of this example. Specifically:

The multi-point parallel synchronous drive solar tracking system includes a main shaft 3 and a plurality of columns 5 for supporting the main shaft 3, the main shaft 3 is used for fixing the solar module 6.

A multi-point parallel synchronous drive device provided on the main shaft 3 is further included. The multi-point parallel synchronous drive device includes a drive mechanism 1 and several stages of driven mechanisms 2 connected by transmission.

A first power output of the drive mechanism 1 is rotatably connected to the main shaft 3, and the main shaft 3 serves as the power output shaft 3. A second power output of the drive mechanism 1 is fixed below the main shaft 3 and parallel to the main shaft 3 in an axial direction.

Several stages of the driven mechanism 2 are arranged at intervals along the main shaft 3, the second power output of the drive mechanism 1 is drivingly connected with the power input end of the adjacent driven mechanism 2 in an axial direction, and the adjacent two stage driven mechanism drivingly connect to each other in the axial direction, the power output of any driven mechanism 2 is rotatably connected to the main shaft 3.

Therefore, the drive mechanism 1 and the several stages driven mechanism 2 are driven to realize multi-point parallel synchronous driving rotation of the main shaft 3.

In the application example, the drive mechanism 1 outputs power to the main shaft 3 and the adjacent driven mechanism 2 in the axial direction through the first and second power outputs, respectively, and the driven mechanism 2 accordingly drives the adjacent driven mechanism 2 in the axial direction, so that the power outputs of the several stages driven mechanisms 2 work on the main shaft 3 together to form a multi-point driving main shaft 3 synchronous rotation coordination. Applying the technical solution, when a strong wind comes, multiple drive points of the system become multiple fixed locking points, which correspondingly greatly reduces the shake of the system, and greatly improves the stability and reliability, so that the distributed wind pressure and wind twist can be achieved, which greatly improves the reliability and stability of the system. Moreover, the two powers of the drive mechanism 1 output in parallel along the direction of the main shaft 3, which makes the system easy to operate and maintain in the north-south direction. In addition, the multi-point parallel synchronous drive devices are arranged at intervals according to the actual size of the photovoltaic string to be carried. The distance between each drive device and the corresponding edge of the supporting system is not more than 10 meters. Therefore, the deformation of the system is greatly reduced in the case of strong winds, the force is reduced, the torque is reduced, the corresponding system cost is also greatly reduced. In practical applications, the multi-point parallel synchronous drive device includes a drive mechanism 1 and a 2 stages driven mechanism 2 drivingly connected. Each system is driven by a multi-point parallel synchronous drive device, which can be used in extreme weather (especially strong winds) to ensure the stability of the system operation. A single system can realize the installation of 4 or more 1500V photovoltaic strings (a single 1500V photovoltaic string is generally 30 components).

As a preferred application example, the driven mechanism 2 is evenly distributed on one side or both sides of the drive mechanism 1. Therefore, the stability and reliability of the multi-point parallel synchronous drive of the main shaft 3 can be further improved.

Application Example 2

As shown in FIGS. 1 to 4, a multi-point parallel synchronous drive solar tracking system is showed, which includes a main shaft 3 and a plurality of columns 5 for supporting the main shaft 3, the main shaft 3 is used for fixing the solar module 6.

A multi-point parallel synchronous drive device provided on the main shaft 3 is further provided. The multi-point parallel synchronous drive device includes a drive mechanism 1 and several stages of driven mechanisms 2 drivingly connected.

The first power output of the drive mechanism 1 is rotatably connected to the main shaft 3, and the main shaft 3 serves as the power output shaft 3, the second power output of the drive mechanism 1 is disposed below the main shaft 3 and is parallel to the main shaft 3 in the axial direction.

The drive mechanism 1 includes a worm gear transmission unit I10 fixed on the column 5 and a transmission gear 11 as a second power output. The worm gear transmission unit I10 includes a worm 100 and a gear I as a first power output. The transmission gear 11 engages with the lower side of the worm I100, the gear I engages with the upper side of the worm I100, and the end surface of the transmission gear 11 is parallel to the end surface of the gear I, the gear I is sleeved on the main shaft 3 and rotatably connected with the main shaft.

Several stages of the driven mechanisms 2 are arranged at intervals along the main shaft 3, and the drive mechanism 1 is drivingly connected to the power input of the adjacent driven mechanism 2 through the transmission gear 11 in the axial direction, and the adjacent two stage driven mechanisms 2 axially and drivingly connected to each other, the power output of any of the driven mechanisms 2 is rotatably connected to the main shaft 3.

Therefore, the drive mechanism 1 and the several stage driven mechanism 2 are driven to realize multi-point parallel synchronous driving rotation of the main shaft 3.

In the application example, the worm gear transmission structure is adopted in the drive mechanism 1, and the power is outputted to the main shaft 3 and the adjacent driven mechanism 2 in the axial direction through the gear I and the transmission gear 11 respectively, and then the adjacent driven mechanism 2 is axially driven accordingly 2, so that the power outputs of the several stages driven mechanism 2 work together on the main shaft 3 to form a multi-point driving main shaft 3 synchronous rotation coordination. In the traditional worm gear drive mechanism, the input shaft and the output shaft are in a vertical relationship, and the application example converts the vertical input and output of the worm gear into two simultaneous outputs parallel to the worm gear output, while retaining the large holding torque of the worm gear structure. The lock effect of the main shaft 3 can be realized under the strong wind condition. In addition, the parallel drive in the application example can effectively reduce the shielding of the solar module, especially the double-sided module, by the transmission component, making the system design more flexible.

In the above application example, a mechanical drive shaft 4 is fixedly connected in the transmission gear 11, the mechanical drive shaft 4 is rotatably fixed between the column 5 and the worm gear unit along with the transmission gear 11, and the mechanical drive shaft 4 is parallel to the main shaft 3, the drive mechanism 1 is drivingly connected to the power input end of the adjacent driven mechanism 2 through the mechanical drive shaft 4, and the adjacent driven mechanisms 2 is drivingly connected to each other through the mechanical drive shaft 4. Therefore, the synchronous coordinated transmission between the drive mechanism 1 and the driven mechanism 2 is realized through the mechanical drive shaft 4, and the drive mechanism 1 outputs the power to the main shaft 3 and the mechanical drive shaft 4 via the gear I and the transmission gear 11 in the axial direction, respectively, so that the drive shaft 4 drives the adjacent driven mechanism 2 and then drives the adjacent driven mechanism 2 to drive axially accordingly, so that the power outputs of the driven mechanisms 2 of several stages work together on the main shaft 3 to form a multi-point drive main shaft 3 to rotate synchronously coordination. Based on the strong torque of the worm gear transmission, the two parallel output of the mechanical drive shaft 4 and the main shaft 3 are designed so that the mechanical drive shaft 4 is arranged in parallel in the space between the bottom of the main shaft 3 and the top of the column 5, which makes full use of space. It is only necessary to avoid the main shaft for the double-sided component shielding, which makes the system layout more convenient.

As a preferred application example, the drive mechanism 1 further includes a drive motor, and the output shaft of the drive motor is drivingly connected to the worm I100, so that the motor drives the worm I100 to rotate the worm gear I, and drives the transmission gear 11 to rotate, or the output shaft of the drive motor is drivingly connected to the mechanical drive shaft 4, so that the motor drives the mechanical drive shaft 4 to drive the transmission gear 11 to rotate, and drives the worm I100 and the gear I to rotate. The layout of the drive motor is more flexible and convenient.

As another preferred application example, the gear I is fixed on both sides along the longitudinal direction of the main shaft 3 with a worm gear housing I101 with mounting holes, and the main shaft 3 is rotatably penetrated in the mounting holes, the gear housing I101 and the column 5 is fixedly connected. More preferably, the column 5 is detachably provided with a pair of mounting side plates 50 along two sides perpendicular to the direction of the main shaft 3, the gear housing I101 is fixed to the pair of mounting side plates 50 through a support base 102, a drive shaft seat 51 is provided between the bottom of the gear housing I101 and the top of the column 5 for rotatably mounting the mechanical drive shaft 4; and the drive shaft seat 51 is fixed between the pair of mounting side plates 50.

In the application example, the gear I in the worm gear drive unit I10 rotatably sleeves the main shaft 3, and is fixed to the column 5 through the gear housing I101, so that when the gear I rotates, correspondingly drives the main shaft 3 to track and rotate. Through the column 5 the fixed support of the main shaft 3 and the drive mechanism 1 is achieved. In addition, by arranging the drive shaft seat 51 in the space between the main shaft 3 and the column 5 by relying on the column 5, the arrangement is flexible and compact, and does not interfere with the solar mounting component.

As another preferred application example, the driven mechanism 2 includes a worm gear drive unit II20 and a connector 21 as a power input end. The worm gear drive unit includes a worm I200 and a gear II as a power output. The connector 21 is respectively connected to the mechanical drive shaft 4 in the axial direction and connected to the worm II 200 in the vertical direction to transmit the axial rotation of the mechanical drive shaft 4 to the worm II200. The upper side of the gear II engages with the worm II200, and the gear II is sleeved on the main shaft 3 and rotatably connected to the main shaft 3.

The application example provides the preferred arrangement form of the driven mechanism 2. The worm gear transmission structure is also used. The drive mechanism outputs power to the main shaft 3, the mechanical drive shaft 4 through the worm gear I and the transmission gear 11 in the axial direction. The mechanical drive shaft 4 transmits the axial rotation to the connector 21 and then to the worm II200, so that the adjacent driven mechanism 2 is driven by the mechanical drive shaft 4 to synchronize the axial transmission, so that the power output of several stages of the driven mechanism 2 work together on the main shaft 3 to form a multi-point drive main shaft 3 synchronous rotation coordination. In practical applications, the multi-point parallel synchronous drive device includes a drive mechanism 1 and a 2 stage driven mechanism 2 drivingly connected. Each system is driven by a multi-point parallel synchronous drive device, which can be used in extreme weather (especially strong winds) to ensure the stability of the system operation. A single system can realize the installation of 4 or more 1500V photovoltaic strings (a single 1500V photovoltaic string generally includes 30 components)

More preferably, the multi-point parallel synchronous drive device is provided as multiple groups in series, and transmission gears 11 and connectors 21 in multiple groups in the series of multi-point parallel synchronous drive devices are connected by the mechanical drive shaft 4, or by multiple mechanical drive shafts, multiple mechanical drive shafts are rotatably connected end to end through the universal joint, which can adapt to different landform. The number of the drive motor is 1, and a controller is provided accordingly, the controller is electrically connected to the drive motor. According to the preferred solution, only one drive motor and controller are needed for a single system (the drive motor and controller can be supported and fixed on the column 5), the controller uses a single chip, and the single chip is electrically connected to the drive motor. All transmission gears and connectors (including between transmission gears and adjacent connectors and between two adjacent connectors) in multiple groups of multi-point parallel synchronous drives are connected by a mechanical drive shaft, or by multiple mechanical drive shafts. The multiple mechanical drive shafts are rotatably connected by universal joint, which can adapt to different landform and drive synchronously, reducing the cost of installation, operation and maintenance. In addition, the aforementioned electrical connection between the drive motor and the controller is a conventional technical means in the field. The model of the single-chip microcomputer is the STM32 series, or other commercially available models can also be selected, which can realize the function of sending command signals to the driving motor, and no further detailed description will be given here.

More preferably, the main shaft 3 is provided in parallel multiple rows, and the corresponding columns 5 are also provided in parallel multiple rows. The worms on the adjacent two rows of main shafts 3 are drivingly connected to each other, respectively, so as to achieve multiple row synchronization linkage in the photovoltaic tracking systems. Specifically, the worm I100 in the main shaft 3 of the first row and the worm I100 in the main shaft 3 of the second row and the n-th row are connected in a one-to-one correspondence, and the several stages of worms II200 in the main shaft 3 of the first row are connected to the second row and the n-th row are connected in a one-to-one correspondence. In practical application, the transmission connection is realized through the transmission shaft, so as to realize multi-row synchronous linkage.

The cooperation form of the drive mechanism and the driven mechanism of the present disclosure can also be adapted to a multi-platform tracking system (that is, the driving of the east-west multi-row tracking system), and the synchronous linkage of the multi-platform tracking system can be realized by drivingly connecting the worms of the adjacent two rows of tracking systems, which makes the technical application scope of the disclosure more extensive and more applicable.

More preferably, the gear II has a gear housing II201 with mounting holes fixed on both sides along the length of the main shaft, the main shaft 3 is rotatably threaded through the mounting holes, 1 the top of the column 5 is detachably connected to the column base 52, the column top seat 52 is provided as a U-shaped bending piece. The connector 21 is placed in the column top seat 52 and passes through column 5 and the mounting holes of the vertical surface of the column top seat 52 along two sides perpendicular to the direction of the main shaft 3 for detachable connection. The gear housing II201 is fixed on the horizontal surface of the column top seat 52. More specifically, the top of the column 5 is provided with a plurality of rows of adjustment holes II, the column top seat is provided as a U-shaped bending piece, and a pair of fixing holes II are oppositely arranged on the two vertical surfaces of the column top seat, the connector 21 is placed in the column top seat 52 and passes through the adjustment hole II and the fixing hole II in order to achieve a height-adjustable detachable connection with the column 5 and the column top seat 52.

This preferred example provides the fixed connection mode of the worm gear drive unit II20 and the column 5 in the driven mechanism 2, and the form of cooperating connection between the mechanical drive shaft 4 and the worm gear drive unit II20. The structure is compactly arranged. The fixed support for the main shaft and the driven mechanism is realized through the column, so that the mechanical drive shaft 4 rotates steadily and maintains a constant parallel drive relationship with the main shaft 3.

More preferably, the connector 21 is a commutator or a universal joint, or an existing component or assembly that can realize the function of commutation and power transmission. As shown in FIG. 4, the connector 21 is a commutator, and the mechanical drive shaft 4 is inserted into the commutator. The commutator is preferably a gear commutator. The gear commutator can synchronously transmit the power of the mechanical drive shaft 4 to the worm II200 of the driven mechanism 2. The working principle of the gear commutator here is the prior art, will not be described here.

In the preferred example, a preferred arrangement form of the driven mechanism 2 is provided, and the axial power from the mechanical drive shaft 4 is transmitted to the worm gear drive unit II20 through the commutation and through the connector 21 that can realize the commutation and power transmission functions, thereby realize the synchronous rotation of the main shaft 3 and the worm gear II.

Application Example 3

In the application example, on the basis of application example 1 or 2, it should be noted that, in addition to the column 5 that synchronously supports the main shaft 3, the drive mechanism 1, and the driven mechanism 2, other columns 5 that independently support the main shaft can be provided. As shown in FIGS. 5a and 5b, the top of this type of column 5 is fixedly connected to the column top seat 52, the main shaft 3 passes through the bearing, and the bearing is installed in the bearing race 30. The column top seat 52 is fixedly connected to the bearing race 30, so as to directly support the main shaft 3 rotatably. In practical applications, the top of the column 5 is provided with an upper and lower adjustable hole IIIC, the column top seat 52 is provided as a U-shaped bending piece, and a group of fixed holes IIID is provided oppositely on the two vertical surfaces of the column top seat 52. Through the coordination of the upper and lower adjustable holes IIIC and the group of fixed hole IIID, the relative height of the column 5 and the column top seat 52 can be adjusted.

Therefore, the column 5 in the present disclosure can be applied to different fixing scenes, supporting and fixing the main shaft 3, the drive mechanism 1, and the driven mechanism 2, and connected to the foundation or directly used as a foundation to support the main shaft 1. In practical applications, the bearing is preferably a polymer bearing.

In addition, the multi-point parallel synchronous drive device of the present disclosure can also be applied to other suitable working scenes, not limited to solar tracking systems.

It should be noted that the above application examples can be freely combined as needed. The above is only the preferred embodiment of the present disclosure. It should be pointed out that those skilled in the art, without departing from the principles of the present disclosure, several improvements and retouches can be made. These improvements and retouches also should be regarded as the protection scope of the present disclosure.

What is claimed is:
1. A drive device, connected with a main shaft (3), the drive device comprising:
 a drive mechanism (1), comprising:
 a first worm gear drive unit (10), comprising a first worm (100) and a first gear that is disposed above the first worm (100) and connected with the main shaft (3);
 a transmission gear (11), disposed below the first worm (100); and
 a drive motor, providing a driving power;
 wherein with driving power, the drive mechanism (1) outputs a first power at the first gear and outputs a second power at the transmission gear (11) and drives transmission of the second power, and a transmission direction of the second power is parallel to the main shaft (3);
 a plurality of driven mechanisms (2), arranged at intervals along the transmission direction of the second power, each of the plurality of driven mechanisms (2) comprising:
 a second worm gear drive unit (20), comprising a second worm (200) and a second gear that is disposed above the second worm (200) and connected with the main shaft (3); and
 a power input, disposed below the second worm for receiving a third power, that is from a transmission of the second power, and transmitting the third power to the second worm (200) to drive the second gear to output a fourth power;
 wherein the first power output by the drive mechanism (1) and fourth powers output by the plurality of driven mechanisms (2) work together on the main shaft (3).

2. The drive device of claim 1, further comprising:
a mechanical drive shaft (4), that is parallel to the main shaft (3), fixedly connected with the transmission gear (11) for transmitting the second power along the transmission direction of the second power.

3. The drive device of claim 2, wherein an output shaft of the drive motor is connected with the first worm (100), and the drive motor drives rotation of the first worm (100), and the rotation of the first worm (100) drives the first gear and the transmission gear (11) to rotate.

4. The drive device of claim 2, wherein an output shaft of the drive motor is connected with the mechanical drive shaft (4), and the drive motor drives rotation of the mechanical drive shaft (4), the rotation of the mechanical drive shaft (4) drives rotation of the transmission gear (11), and the rotation of the transmission gear (11) drives the first worm (100) and the first gear to rotate.

5. The drive device of claim 2, wherein the power input is a connector (21), respectively connected with the mechanical drive shaft (4) in an axial direction and connected with the second worm (200) in a vertical direction, for transmitting a rotation of the mechanical drive shaft (4) to the second worm (200), and a rotation of the second worm (200) drives the second gear to output the fourth power.

6. The drive device of claim 5, wherein the connector (21) is a commutator or a universal joint.

7. The drive device of claim 1, wherein an end surface of the transmission gear (11) is parallel to an end surface of the first gear.

8. A solar tracking bracket, comprising:
a main shaft (3);
a drive device, comprising:
a drive mechanism (1), comprising:
a first worm gear drive unit (10), comprising a first worm (100) and a first gear that is disposed above the first worm (100) and connected with the main shaft (3);
a transmission gear (11), disposed below the first worm (100); and
a drive motor, providing a driving power;
wherein with driving power, the drive mechanism (1) outputs a first power at the first gear and outputs a second power at the transmission gear (11) and drives transmission of the second power, and a transmission direction of the second power is parallel to the main shaft (3);
a plurality of driven mechanisms (2), arranged at intervals along the transmission direction of the second power, each of the plurality of driven mechanisms (2) comprising:
a second worm gear drive unit (20), comprising a second worm (200) and a second gear that is disposed above the second worm (200) and connected with the main shaft (3); and
a power input, disposed below the second worm (200) for receiving a third power, that is from a transmission of the second power, and transmitting the third power to the second worm (200) to drive the second gear to output a fourth power;
wherein the first power output by the drive mechanism (1) and fourth powers output by the plurality of driven mechanisms (2) work together on the main shaft.

9. The solar tracking bracket of claim 8, further comprising:
a mechanical drive shaft (4), that is parallel to the main shaft (3), fixedly connected with the transmission gear (11) for transmitting the second power along the transmission direction of the second power.

10. The solar tracking bracket of claim 9, wherein an output shaft of the drive motor is connected with the first worm (100), and the drive motor drives rotation of the first worm (100), and the rotation of the first worm (100) drives the first gear and the transmission gear (11) to rotate.

11. The solar tracking bracket of claim 9, wherein an output shaft of the drive motor is connected with the mechanical drive shaft (4), and the drive motor drives rotation of the mechanical drive shaft (4), the rotation of the mechanical drive shaft (4) drives rotation of the transmission gear (11), and the rotation of the transmission gear (11) drives the first worm (100) and the first gear to rotate.

12. The solar tracking bracket of claim 9, wherein the power input is a connector (21), respectively connected with the mechanical drive shaft (4) in an axial direction and connected with the second worm (200) in a vertical direction, for transmitting a rotation of the mechanical drive shaft (4) to the second worm (200), and a rotation of the second worm (200) drives the second gear to output the fourth power.

13. The solar tracking bracket of claim 8, wherein an end surface of the transmission gear (11) is parallel to an end surface of the first gear.

14. The solar tracking bracket of claim 8, further comprising:
a first gear housing (101) with a mounting hole running through both sides of the first gear along the main shaft;
a plurality of second gear housings (201), wherein each of the plurality of second gear housings (201) has a mounting hole running through both sides of the second gear along the main shaft (3),
wherein the main shaft (3) inserts the mounting hole of the first gear housing (101) and mounting holes of the plurality of second gear housings (201).

15. The solar tracking bracket of claim 14, further comprising:
a first column (5), detachably provided with a pair of mounting side plates (50) along two sides of the first column (5) perpendicular to the main shaft (3);
a support base (102), disposed on the pair of mounting side plates (50) for fixedly mounting the first gear housing (101); and
a drive shaft seat (51), disposed between a bottom of the first gear housing (101) and a top of the first column (5), and between the pair of mounting side plates (50), for rotatably mounting the mechanical drive shaft (4).

16. The solar tracking bracket of claim 14, for each of the plurality of driven mechanisms (2), the drive device further comprises:
a second column (5);
a column top seat (52), detachably connected to a top of the second column (5), and having a horizontal surface and a pair of vertical surfaces that is disposed at two sides of the horizontal surface;
the power input is detachably mounted in the column top seat (52) and between the pair of vertical surfaces, and the second gear housing (201) is fixed on the horizontal surface.

17. The solar tracking bracket of claim 16, wherein the top of the second column (5) is provided with a plurality of rows of adjustment holes (C), and a pair of fixing holes (D) is oppositely arranged on the pair of vertical surfaces.

18. The solar tracking bracket of claim 8, wherein the plurality of driven mechanisms (2) are evenly distributed from one or both sides of the drive mechanism (1).

19. A solar tracking system, comprising:
a main shaft (3);
a solar module (6), fixed on the main shaft (3);
a drive device, comprising:
a drive mechanism (1), comprising:
a first worm gear drive unit (10), comprising a first worm (100) and a first gear that is disposed above the first worm (100) and connected with the main shaft (3);
a transmission gear (11), disposed below the first worm (100); and
a drive motor, providing a driving power;
wherein with driving power, the drive mechanism (1) outputs a first power at the first gear and outputs a second power at the transmission gear (11) and drives transmission of the second power, and a transmission direction of the second power is parallel to the main shaft (3);
a plurality of driven mechanisms (2), arranged at intervals along the transmission direction of the second power, each of the plurality of driven mechanisms (2) comprising:
a second worm gear drive unit (20), comprising a second worm (200) and a second gear that is disposed above the second worm (200) and connected with the main shaft (3); and
a power input, disposed below the second worm (200) for receiving a third power, that is from a transmission of the second power, and transmitting the third power to the second worm (200) to drive the second gear to output a fourth power;
wherein the first power output by the drive mechanism (1) and fourth powers output by the plurality of driven mechanisms (2) work together on the main shaft (3).

20. The solar tracking system of claim 19, wherein the drive device comprises a plurality of parallel rows, each of the parallel rows comprises the first worm gear drive unit (10) and the second worm gear drive unit (20), and first worms (100) of adjacent rows are drivingly connected to each other, and second worms (200) of adjacent rows are drivingly connected to each other.

\* \* \* \* \*